(12) United States Patent
Lee

(10) Patent No.: US 8,836,634 B2
(45) Date of Patent: Sep. 16, 2014

(54) STEREOSCOPIC IMAGE DISPLAY AND METHOD FOR DRIVING THE SAME

(75) Inventor: Jaeyong Lee, Gumi-si (KR)

(73) Assignee: LG Display Co., Ltd., Seoul (KR)

(*) Notice: Subject to any disclaimer, the term of this patent is extended or adjusted under 35 U.S.C. 154(b) by 221 days.

(21) Appl. No.: 12/980,119

(22) Filed: Dec. 28, 2010

(65) Prior Publication Data

US 2012/0038690 A1 Feb. 16, 2012

(30) Foreign Application Priority Data

Aug. 11, 2010 (KR) ........................ 10-2010-0077184

(51) Int. Cl.
*G09G 3/36* (2006.01)
*G09G 5/10* (2006.01)
*G09G 5/00* (2006.01)
*G02B 27/22* (2006.01)
*H04N 15/00* (2006.01)
*H04N 13/00* (2006.01)
*H04N 13/04* (2006.01)
*H04N 9/47* (2006.01)
*G09G 3/00* (2006.01)
*G09G 3/34* (2006.01)

(52) U.S. Cl.
CPC ...... *G09G 3/3406* (2013.01); *G09G 2310/0237* (2013.01); *H04N 13/0438* (2013.01); *G09G 3/003* (2013.01); *G02B 27/2264* (2013.01); *H04N 13/0497* (2013.01)
USPC ............... 345/102; 345/691; 345/87; 345/96; 345/6; 359/462; 348/42; 348/51; 348/53; 348/56

(58) Field of Classification Search
CPC ......... G09G 3/003; G09G 3/342; G09G 3/36; G09G 3/3406; G09G 3/3413; G09G 3/3426; G09G 2310/0209; G09G 2310/0203; G09G 2310/0233; G09G 2310/0238; G09G 2310/0252; G09G 2310/0257; H04N 13/00; G02B 27/02
USPC ................ 345/1.1–6, 32, 204–215, 690–699; 359/462–477; 348/42, 51, 54–56
See application file for complete search history.

(56) References Cited

U.S. PATENT DOCUMENTS

| 2007/0229395 A1 | 10/2007 | Slavenburg et al. |
| 2010/0289883 A1* | 11/2010 | Goris et al. ..................... 348/56 |
| 2011/0012896 A1* | 1/2011 | Ji ................................. 345/419 |
| 2011/0157332 A1* | 6/2011 | Kim et al. ....................... 348/56 |

* cited by examiner

*Primary Examiner* — Sumati Lefkowitz
*Assistant Examiner* — David Tung
(74) *Attorney, Agent, or Firm* — Birch, Stewart, Kolasch & Birch, LLP

(57) ABSTRACT

A stereoscopic image display and a method for driving the same are disclosed. The stereoscopic image display includes a display panel that displays a 2D image data in a 2D mode and displays a 3D image data in a 3D mode, a backlight unit providing light to the display panel, a timing controller that supplies a left eye image data during a data addressing period of a (2N−1)th frame period and supplies a right eye image data during a data addressing period of a 2Nth frame period in the 3D mode, where N is a natural number, and a backlight controller generating a backlight control signal for controlling light sources of the backlight unit so that the light sources of the backlight unit are turned on during a vertical blanking interval of each of the (2N−1)th frame period and the 2Nth frame period in the 3D mode.

16 Claims, 7 Drawing Sheets

STEREOSCOPIC IMAGE DISPLAY AND METHOD FOR DRIVING THE SAME

This application claims the benefit of Korea Patent Application No. 10-2010-077184 filed on Aug. 11, 2010, the entire contents of which is incorporated herein by reference for all purposes as if fully set forth herein.

BACKGROUND OF THE INVENTION

1. Field of the Invention

Exemplary embodiments of the invention relate to a stereoscopic image display and a method for driving the same.

2. Discussion of the Related Art

A stereoscopic image display is classified into a display using a stereoscopic technique and a display using an autostereoscopic technique. The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time-division manner, and thus a stereoscopic image is implemented using polarization glasses or shutter glasses. In the non-glasses type method, an optical axis of the parallax image between the left and right eyes is separated using an optical plate such as a parallax barrier and a lenticular lens, and thus the stereoscopic image is implemented.

FIG. 1 schematically illustrates a shutter glasses type stereoscopic image display. In FIG. 1, a black region of shutter glasses ST represents a shutter that blocks light traveling toward an observer (i.e., viewer), and a white region of the shutter glasses ST represents a shutter allowing transmission of light toward the observer. When a liquid crystal display element is selected as a display element DIS, a backlight unit providing light to the display element DIS is necessary.

As shown in FIG. 1, during odd-numbered frame periods, left eye image data $RGB_L$ is written to the display element DIS, and a left eye shutter $ST_L$ of the shutter glasses ST is opened. During even-numbered frame periods, right eye image data $RGB_R$ is written to the display element DIS, and a right eye shutter $ST_R$ of the shutter glasses ST is opened. Thus, the observer can view only a left eye image during the odd-numbered frame periods and can view only a right eye image during the even-numbered periods, thereby obtaining a stereoscopic feeling.

A method illustrated in FIG. 2 of U.S. Pat. No. 7,724,211 is known as method for driving the shutter glasses type stereoscopic image display. As shown in FIG. 2, the method includes at least two frame periods, for example such as a (2N−1)th frame period and (2N)th frame period in order to display the stereoscopic image, wherein N is a natural number. The (2N−1)th frame period includes a data addressing period in which data of a single eye image (i.e., a left or right eye image) is addressed, and a vertical blanking interval VBI. The 2Nth frame period includes a data addressing period in which data of another single eye image (i.e., the right or left eye image) is addressed and a vertical blanking interval VBI. In the method illustrated in FIG. 2, if left eye image data is addressed during the data addressing period of the (2N−1)th frame period, the left eye shutter may be opened during the vertical blanking interval VBI of the (2N−1)th frame period. If right eye image data is addressed during the data addressing period of the 2Nth frame period, the right eye shutter may be opened during the vertical blanking interval VBI of the 2Nth frame period.

However, in the method illustrated in FIG. 2, when a stereoscopic image is displayed, the shutter glasses is driven during only the vertical blanking intervals VBIs which are relatively shorter than the data addressing period. Hence, a luminance of a three-dimensional (3D) mode is reduced to approximately 1/10 of a luminance of a two-dimensional (2D) mode because of a rising response delay $T_R$ of liquid crystals of the shutter glasses. Further, 3D crosstalk may be generated because of a falling response delay $T_F$ of the liquid crystals of the shutter glasses. The 3D crosstalk means an incomplete isolation of the left and right images so that one leaks or bleeds into the other.

SUMMARY OF THE INVENTION

Exemplary embodiments of the invention provide a stereoscopic image display and a method for driving the same capable of improving a luminance of a 3D mode.

In one aspect, there is a stereoscopic image display comprising a display panel configured to display a two-dimensional (2D) image data in a 2D mode and display a three-dimensional (3D) image data in a 3D mode, a backlight unit configured to provide light to the display panel, a timing controller configured to supply a left eye image data during a data addressing period of a (2N−1)th frame period and supply a right eye image data during a data addressing period of a 2Nth frame period in the 3D mode, where N is a natural number, a backlight controller configured to generate a backlight control signal for controlling light sources of the backlight unit so that the light sources of the backlight unit are turned on during a vertical blanking interval of each of the (2N−1)th frame period and the 2Nth frame period in the 3D mode, a backlight driver configured to supply a backlight driving current to the light sources of the backlight unit in response to the backlight control signal, and shutter glasses including a left eye shutter and a right eye shutter that are electrically controlled and are alternately opened and closed.

In another aspect, there is stereoscopic image display comprising a display panel configured to display a two-dimensional (2D) image data in a 2D mode and display a three-dimensional (3D) image data in a 3D mode; a backlight unit configured to provide light to the display panel; a timing controller configured to supply a left eye image data during a data addressing period of a (2N)th frame period and supply a right eye image data during a data addressing period of a (2N−1)th frame period in the 3D mode, where N is a natural number; a backlight controller configured to generate a backlight control signal for controlling light sources of the backlight unit so that the light sources of the backlight unit are turned on during a vertical blanking interval of each of the (2N−1)th frame period and the 2Nth frame period in the 3D mode; a backlight driver configured to supply a backlight driving current to the light sources of the backlight unit in response to the backlight control signal; and shutter glasses including a left eye shutter and a right eye shutter that are electrically controlled and are alternately opened and closed.

In another aspect, there is a method for driving a stereoscopic image display including a display panel configured to display a 2D image data in a 2D mode and display a 3D image data in a 3D mode, a backlight unit configured to provide light to the display panel, a backlight driver configured to supply a backlight driving current to light sources of the backlight unit, and a shutter glasses including a left eye shutter and right eye shutter that are electrically controlled and are alternately opened and closed, the method comprising supplying a left eye image data during a data addressing period of a (2N−1)th frame period and supplying a right eye image data during a data addressing period of a 2Nth frame period in the 3D mode, where N is a natural number, generating a backlight control signal for controlling the light sources of the backlight unit so that the light sources of the backlight unit are turned on during a vertical blanking interval of each of the (2N−1)th frame period and the 2Nth frame period in the 3D mode, supplying the backlight driving current to the light sources of the backlight unit in response to the backlight control signal.

In another aspect, there is a method for driving a stereoscopic image display including a display panel configured to display a 2D image data in a 2D mode and display a 3D image data in a 3D mode, a backlight unit configured to provide light to the display panel, a backlight driver configured to supply a backlight driving current to light sources of the backlight unit, and a shutter glasses including a left eye shutter and right eye shutter that are electrically controlled and are alternately opened and closed, the method comprising supplying a left eye image data during a data addressing period of a 2Nth frame period and supplying a right eye image data during a data addressing period of a (2N−1)th frame period in the 3D mode, where N is a natural number; generating a backlight control signal for controlling the light sources of the backlight unit so that the light sources of the backlight unit are turned on during a vertical blanking interval of each of the (2N−1)th frame period and the 2Nth frame period in the 3D mode; supplying the backlight driving current to the light sources of the backlight unit in response to the backlight control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
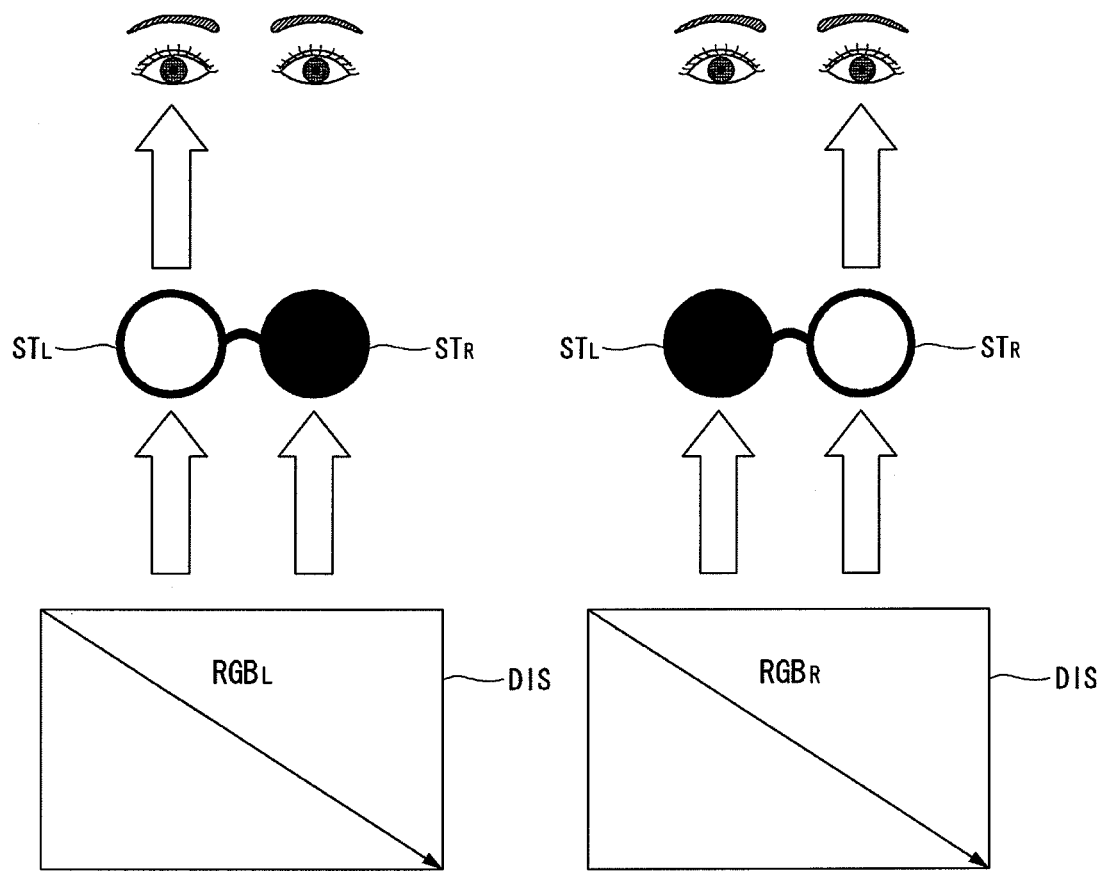
FIG. 1 illustrates a time-division operation of left and right eye images in a related art shutter glasses type stereoscopic image display.
Figure 2:
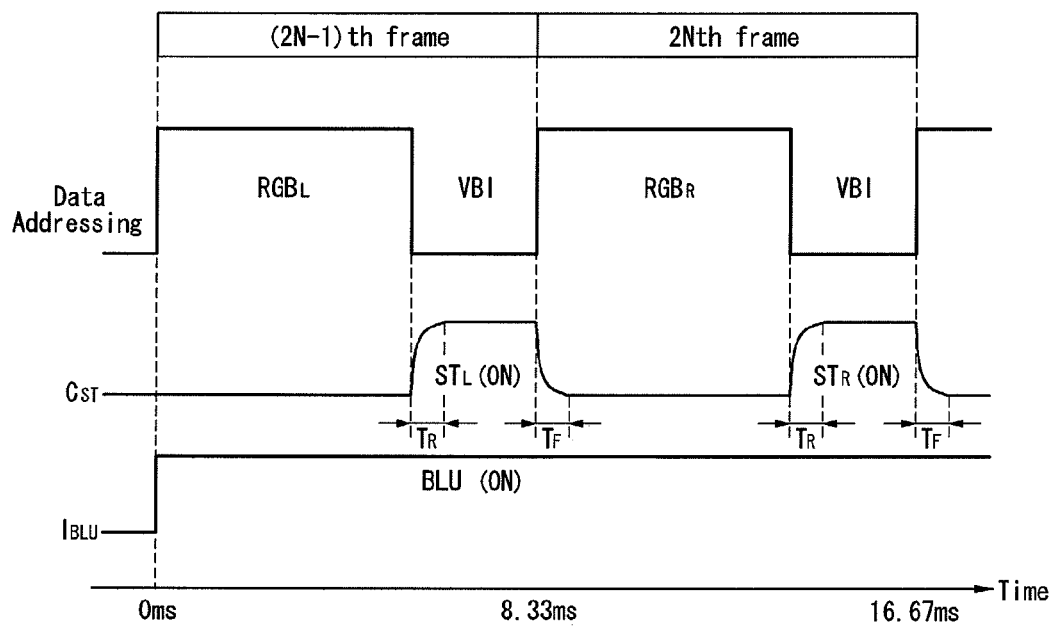
FIG. 2 is a waveform diagram illustrating a driving waveform of a related art shutter glasses type stereoscopic image display.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Names of elements used in the following description are selected in consideration of facility of specification preparation. Thus, the names of the elements may be different from names of elements used in a real product.

An image display according to an exemplary embodiment of the invention may be implemented as a flat panel display such as a liquid crystal display (LCD), a field emission display (FED), a plasma display panel (PDP), an organic light emitting diode (OLED) display. Although the embodiment of the invention describes the liquid crystal display as an example, other displays may be used.

Figure 3:
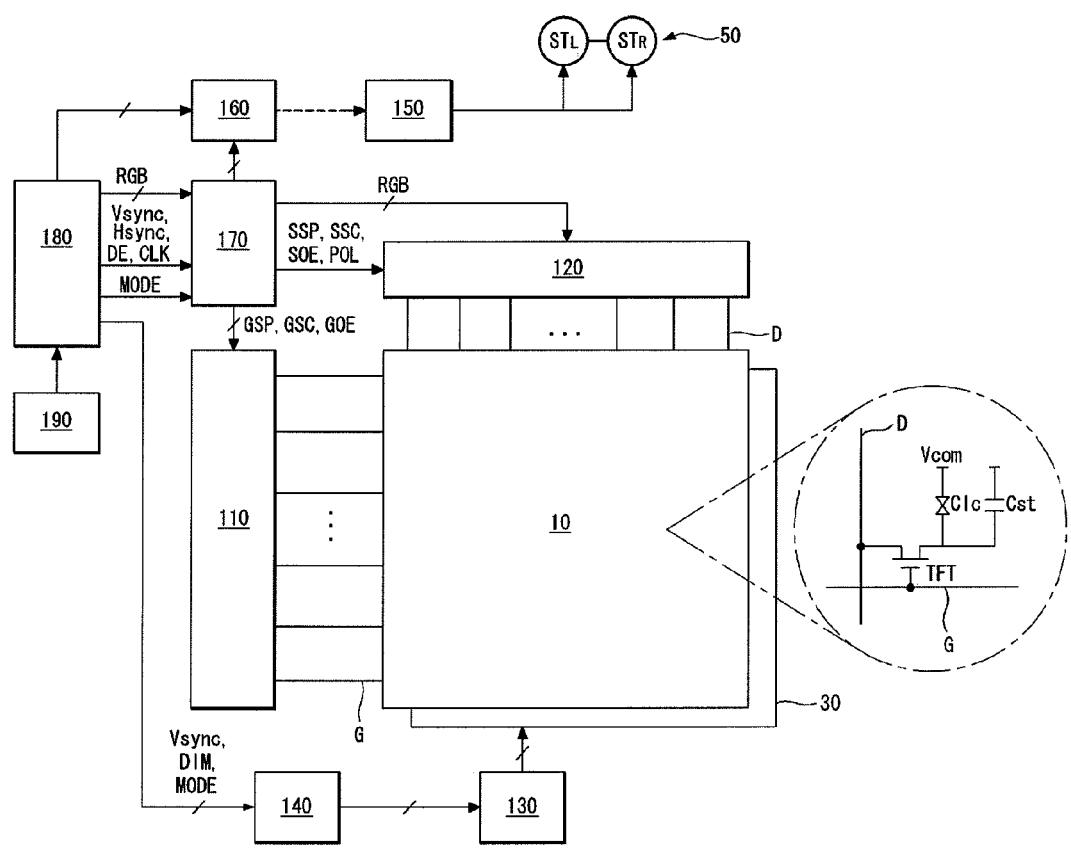
FIG. 3 is a block diagram of a stereoscopic image display according to an exemplary embodiment of the invention.

FIG. 3 is a block diagram of a stereoscopic image display according to an exemplary embodiment of the invention. As shown in FIG. 3, a stereoscopic image display according to an exemplary embodiment of the invention includes a display panel 10, a backlight unit 30, shutter glasses 50, a gate driving circuit 110, a data driving circuit 120, a backlight driver 130, a backlight controller 140, a shutter control signal receiving unit 150, a shutter control signal transmitting unit 160, a timing controller 170, a system board 180, and a user input device 190.

The display panel 10 includes an upper glass substrate, a lower glass substrate, and a liquid crystal layer between the upper and lower glass substrates. The display panel 10 includes liquid crystal cells Clc arranged in a matrix form based on a crossing structure of data lines D and gate lines G.

The data lines D, the gate lines G, thin film transistors (TFTs), storage capacitors Cst and so on are formed on the lower glass substrate of the display panel 10. The liquid crystal cells Clc of the display panel 10 are driven by an electric field between a pixel electrode connected to each TFT and a common electrode Vcom receiving a common voltage. Black matrixes, color filters, the common electrodes and so on are formed on the upper glass substrate of the display panel 10. Polarizing plates are respectively attached to the upper and lower glass substrates of the display panel 10. Alignment layers for setting a pre-tilt angle of liquid crystals are respectively formed on the upper and lower glass substrates. In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate together with the pixel electrodes. The display panel 10 applicable to the exemplary embodiment of the invention may be implemented in any liquid crystal mode as well as the TN, VA, IPS, and FFS modes.

The backlight unit 30 may be implemented as one of an edge type backlight unit and a direct type backlight unit. In the edge type backlight unit, a plurality of light sources are positioned opposite the side of a light guide plate (not shown), and a plurality of optical sheets are positioned between the display panel 10 and the light guide plate. In the direct type backlight unit, a plurality of optical sheets and a diffusion plate are stacked under the display panel 10, and a plurality of light sources are positioned under the diffusion plate. The light sources may be implemented as at least one of a cold cathode fluorescent lamp (CCFL), an external electrode fluorescent lamp (EEFL), and a light emitting diode (LED). The light emitting diode may be preferably used because a luminance of the light emitting diode may be easily controlled through an adjustment of a forward current.

The shutter glasses 50 include a left eye shutter $ST_L$ and a right eye shutter $ST_R$ which are separately controlled electrically. Each of the left eye shutter $ST_L$ and the right eye shutter $ST_R$ includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode of each of the left and right eye shutters $ST_L$ and $ST_R$, each of the left and right eye shutters $ST_L$ and $ST_R$ transmits light from the display panel 10. On the other hand, when the OFF voltage is supplied to the second transparent electrode of each of the left and right eye shutters $ST_L$ and $ST_R$, each of the left and right eye shutters $ST_L$ and $ST_R$ blocks light from the display panel 10.

The shutter control signal receiving unit 150 receives a shutter control signal $C_{ST}$ through a wire or wireless interface. The shutter control signal receiving unit 150 alternately opens and closes the left and right eye shutters $ST_L$ and $ST_R$ of the shutter glasses 50 in response to the shutter control signal $C_{ST}$. When the shutter control signal $C_{ST}$ of a first logic value is input to the shutter control signal receiving unit 150, the ON voltage is supplied to the second transparent electrode of the left eye shutter $ST_L$ and the OFF voltage is supplied to the second transparent electrode of the right eye shutter $ST_R$. When the shutter control signal $C_{ST}$ of a second logic value is input to the shutter control signal receiving unit 150, the OFF voltage is supplied to the second transparent electrode of the left eye shutter $ST_L$ and the ON voltage is supplied to the second transparent electrode of the right eye shutter $ST_R$. Accordingly, the left eye shutter $ST_L$ of the crystal shutter glasses 50 is opened when the shutter control signal $C_{ST}$ of the first logic value is generated, and the right eye shutter $ST_R$ of the shutter glasses 50 is opened when the shutter control signal $C_{ST}$ of the second logic value is generated. The first logic value may be set to a high logic voltage, and the second logic value may be set to a low logic voltage.

The timing controller 170 supplies digital video data RGB received from the system board 180 to the data driving circuit 120. The timing controller 170 receives a timing signal, such as a vertical sync signal Vsync, a horizontal sync signal Hsync, a data enable signal DE, and a dot clock signal CLK from the system board 180. The timing controller 170 then generates control signals for controlling an operation timing of each of the data driving circuit 120 and the gate driving circuit 110. The control signals include a gate control signal for controlling the operation timing of the gate driving circuit 110 and a data control signal for controlling the operation timing of the data driving circuit 120 and a polarity of a data voltage.

In a three-dimensional (3D) mode, the timing controller 170 outputs the shutter control signal $C_{ST}$ to the shutter control signal transmitting unit 160 so as to alternately open and close the left eye shutter $ST_L$ and the right eye shutter $ST_R$ of the shutter glasses 50. The shutter control signal transmitting unit 160 transmits the shutter control signal $C_{ST}$ to the shutter control signal receiving unit 150 through the wire/wireless interface. The shutter control signal receiving unit 150 may be mounted inside the shutter glasses 50. Alternatively, the shutter control signal receiving unit 150 may be manufactured as a separate module and may be attached to the shutter glasses 50.

The timing controller 170 may switch between operations of a two-dimensional (2D) mode and the 3D mode based on a mode signal MODE received from the system board 180 or a mode identification code coded in an input image signal. The timing controller 170 or the system board 180 multiplies an input frame frequency of 60 Hz by 'i', thereby driving the display panel 10 at a frame frequency of (60×i) Hz, where 'i' is an integer equal to or greater than 2. The input frame frequency is 50 Hz in a Phase Alternate Line (PAL) manner and is 60 Hz in a National Television Standards Committee (NTSC) manner. When the input frame frequency is multiplied by 4 and is 200 Hz in the PAL manner, one frame period is approximately 5 msec. When the input frame frequency is multiplied by 4 and is 240 Hz in the NTSC manner, one frame period is approximately 4.16 msec.

The gate control signal includes a gate start pulse GSP, a gate shift clock GSC, a gate output enable GOE, and the like. The gate start pulse GSP is applied to a first gate driver integrated circuit (IC) generating a first gate pulse and controls the first gate driver IC so that the first gate pulse is generated by the first gate driver IC. The gate shift clock GSC is a clock commonly input to a plurality of gate driver ICs of the gate driving circuit 110 and also is a clock for shifting the gate start pulse GSP. The gate output enable GOE controls outputs of the gate driver ICs. The gate driving circuit 110 sequentially supplies a gate pulse to the gate lines G in response to the gate control signal.

The data control signal includes a source start pulse SSP, a source sampling clock SSC, a polarity control signal POL, a source output enable SOE, and the like. The source start pulse SSP controls a data sampling start time of the data driving circuit 120. The source sampling clock SSC controls a sampling time of data in the data driving circuit 120 based on a rising or falling edge. The polarity control signal POL controls a polarity of the data voltage output from the data driving circuit 120. The source output enable SOE controls an output time of the data driving circuit 120. If the digital video data RGB to be input to the data driving circuit 120 is transferred based on a mini low voltage differential signaling (LVDS) interface standard, the source start pulse SSP and the source sampling clock SSC may be omitted.

The data driving circuit 120 includes a plurality of source driver ICs. Each of the source driver ICs includes a shift register, a latch, a digital-to-analog converter (DAC), an output buffer, and the like. The data driving circuit 120 latches the digital video data RGB under the control of the timing controller 170. The data driving circuit 120 converts the latched digital video data RGB into positive and negative analog gamma compensation voltages and inverts the polarity of the data voltage in response to the polarity control signal POL. The data driving circuit 120 inverts the polarities of the data voltages output to the data lines D in response to the polarity control signal POL.

The backlight controller 140 distinguishes the 2D mode from the 3D mode in response to the mode signal MODE received from the system board 180 or the timing controller 170. The backlight controller 140 transmits backlight control data to the backlight driver 130 in a serial peripheral interface (SPI) data format according to the global/local dimming signal DIM received from the system board 180 or the timing controller 170 so that a backlight luminance is controlled in response to the global/local dimming signal DIM. The backlight control data includes a control value of a duty ratio of a pulse width modulation (PWM) signal. The backlight controller 140 lowers the duty ratio of the PWM signal in the 3D mode to be less than the 2D mode, thereby reducing a turn-on ratio of the light sources in the 3D mode. The backlight controller 140 generates the backlight control data that controls a rising time and a falling time of the PWM signal in the SPI data format. Herein, the PWM signal determines a turn-on time and a turn-off time of the light sources based on the vertical sync signal in the 3D mode. The backlight controller 140 may be mounted inside the timing controller 170.

The backlight driver 130 reduces the PWM duty ratio of the light sources in the 3D mode in response to the backlight control data received from the backlight controller 140, so that the turn-on ratio of the light sources in the 3D mode is less than the 2D mode. The backlight driver 130 increases a backlight driving current $I_{BLU}$ applied to the light sources in the 3D mode to be greater than the 2D mode. Accordingly, the stereoscopic image display according to the exemplary embodiment of the invention controls the light sources so that the turn-on ratio of the light sources in the 3D mode is less than the 2D mode, thereby preventing 3D crosstalk. Further, the stereoscopic image display according to the exemplary embodiment of the invention increases a luminance of the light sources in the 3D mode.

The backlight driving current $I_{BLU}$ may be controlled in such a manner that a switch receiving the mode signal MODE selects a different resistor configuration in each of the 2D mode and the 3D mode. For example, the switch receiving the mode signal MODE is constructed by connecting resistors in series to one another in the 2D mode and by connecting the resistors in parallel to one another in the 3D mode. Further, a method for controlling the backlight driving current $I_{BLU}$ may be implemented using a method disclosed in Korea Patent Application No. 10-2010-0042518.

The system board 180 supplies 2D or 3D image data and the timing signals Vsync, Hsync, DE and CLK to the timing controller 170 through an interface, such as a low voltage differential signaling (LVDS) interface and a transition minimized differential signaling (TMDS) interface. The system board 180 supplies a 2D image to the timing controller 170 in the 2D mode and supplies a 3D image including a left eye image and a right eye image to the timing controller 170 in the 3D mode. The system board 180 may transmit the 2D image data and the 3D image data to the timing controller 170 at the frame frequency of (60×i) Hz. The system board 180 or the timing controller 170 analyzes the 2D image data and the 3D image data and calculates a global or local dimming value capable of increasing contrast characteristics of a display image based on the result of the analysis, thereby generating the global/local dimming signal DIM having the calculated global/local dimming value.

A user may select the 2D mode or the 3D mode using a user input device 190. The user input device 190 includes a touch screen, an on-screen display (OSD), a keyboard, a mouse, a remote controller, etc. that are attached to or mounted inside the display panel 10. The system board 180 may switch between the operation of the 2D mode and the operation of the 3D mode in response to user data input through the user input device 190. The system board 180 may switch between the operation of the 2D mode and the operation of the 3D mode through a 2D or 3D identification code encoded to input image data.

Figure 4:
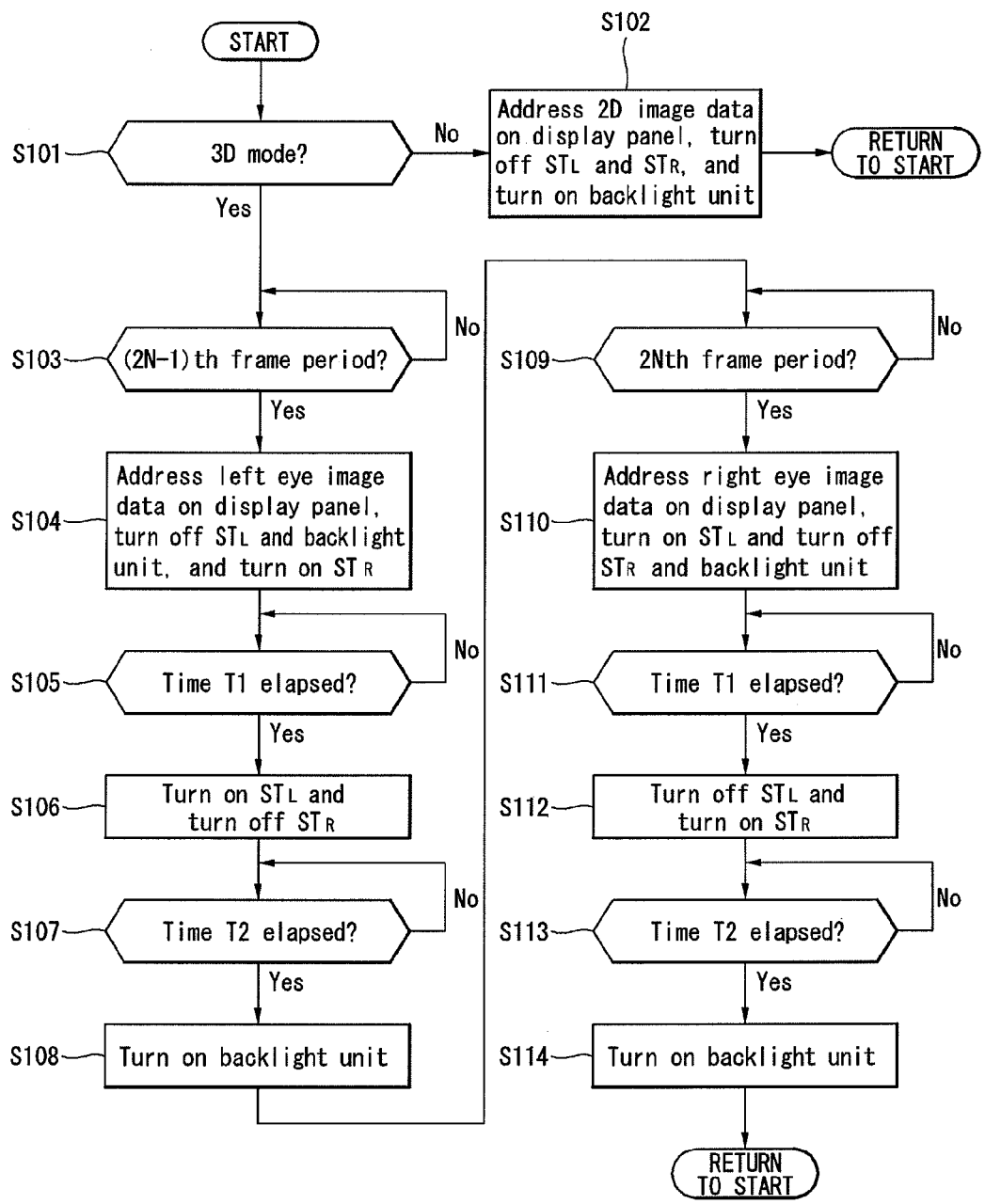
FIG. 4 is a flow chart illustrating a method for driving a stereoscopic image display according to an exemplary embodiment of the invention.
Figure 5A:
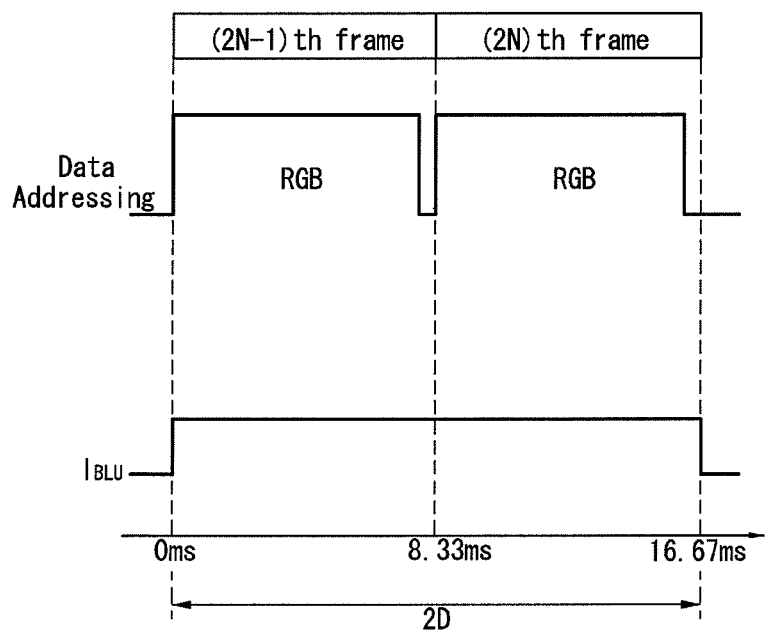
FIG. 5A is a waveform diagram illustrating a driving waveform when the stereoscopic image display according to an exemplary embodiment of the invention is driven in a 2D mode.

FIG. 4 is a flow chart illustrating a method for driving the stereoscopic image display according to the exemplary embodiment of the invention. FIG. 5A is a waveform diagram illustrating a driving waveform when the stereoscopic image display according to an exemplary embodiment of the invention is driven in a 2D mode, and FIG. 5B is a waveform diagram illustrating a driving waveform of when the stereoscopic image display according to an exemplary embodiment of the invention is driven in a 3D mode.

Figure 5B:
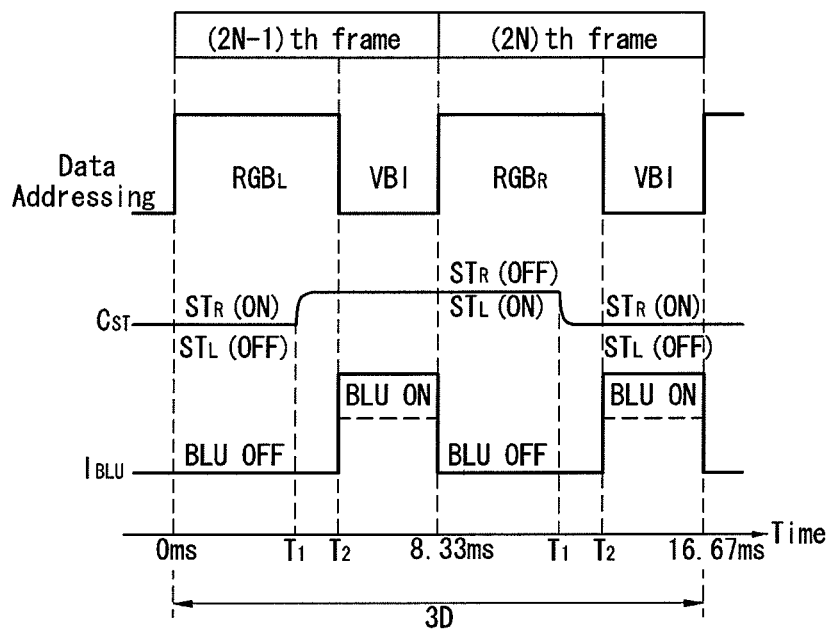
FIG. 5B is a waveform diagram illustrating a driving waveform of when the stereoscopic image display according to an exemplary embodiment of the invention is driven in a 3D mode.

As shown in FIGS. 4, 5A and 5B, the timing controller 170 distinguishes the 2D mode from the 3D mode in response to the mode signal MODE received from the system board 180. When the mode signal MODE indicating the 2D mode is input, the timing controller 170 supplies the gate control signal of the 2D mode to the gate driving circuit 110 and supplies the data control signal of the 2D mode to the data driving circuit 120. The timing controller 170 supplies 2D image data RGB to the data driving circuit 120 and charges the data voltage into the liquid crystal cells Clc of the display panel 10. Further, when the mode signal MODE indicating the 2D mode is input, the timing controller 170 does not output the shutter control signal $C_{ST}$.

The backlight controller 140 distinguishes the 2D mode from the 3D mode in response to the mode signal MODE received from the system board 180. When the mode signal MODE indicating the 2D mode is input, the backlight controller 140 transmits the backlight control data in which the duty ratio of the PWM signal is set 100% to the backlight driver 130.

The data driving circuit 120 converts the 2D image data RGB into the data voltage and supplies the converted data voltage to the data lines D of the display panel 10. The backlight driver 130 turns on the light sources of the backlight unit 30 in response to the backlight control data received from the backlight controller 140 (steps S101 and 102).

When the mode signal MODE indicating the 3D mode is input, the timing controller 170 supplies left eye image data $RGB_L$ and the data control signal to the data driving circuit 120 and supplies the gate control signal to the gate driving circuit 110 during a duration ranging from a start time of a (2N−1)th frame period to a predetermined time T1, where N is a natural number. The timing controller 170 supplies the shutter control signal $C_{ST}$ of a low logic level to the shutter control signal transmitting unit 160 as soon as the (2N−1)th frame period starts. The backlight controller 140 transmits the backlight control data of the SPI data format for turning off the light sources of the backlight unit 30 to the backlight driver 130 as soon as the (2N−1)th frame period starts.

The gate driving circuit 110 sequentially supplies the gate pulse to the gate lines G. The data driving circuit 120 converts the left eye image data $RGB_L$ into the data voltage and supplies the data voltage to the data lines D of the display panel 10. The shutter control signal transmitting unit 160 transmits the shutter control signal $C_{ST}$ of the low logic level to the shutter control signal receiving unit 150, and the shutter control signal receiving unit 150 opens only the right eye shutter $ST_R$ in response to the shutter control signal $C_{ST}$ of the low logic level (steps S103 and 104).

After the predetermined time T1 elapsed from the start time of the (2N−1)th frame period, the timing controller 170 changes the logic level of the shutter control signal $C_{ST}$ from the low logic level to a high logic level and supplies the shutter control signal $C_{ST}$ of the high logic level to the shutter control signal transmitting unit 160. The shutter control signal transmitting unit 160 transmits the shutter control signal $C_{ST}$ of the high logic level to the shutter control signal receiving unit 150, and the shutter control signal receiving unit 150 opens only the left eye shutter $ST_L$ in response to the shutter control signal $C_{ST}$ of the high logic level (steps S105 and 106).

After a predetermined time T2 elapsed from the start time of the (2N−1)th frame period, the backlight controller 140 transmits the backlight control data of the SPI data format for turning on the light sources of the backlight unit 30 to the backlight driver 130. The backlight driver 130 turns on the light sources of the backlight unit 30 in response to the backlight control data of the SPI data format (steps S107 and 108).

The timing controller 170 supplies right eye image data $RGB_R$ and the data control signal to the data driving circuit 120 and supplies the gate control signal to the gate driving circuit 110 during a duration ranging from a start time of a 2Nth frame period to a predetermined time T1. The timing controller 170 supplies the shutter control signal $C_{ST}$ of the high logic level to the shutter control signal transmitting unit 160 as soon as the 2Nth frame period starts. The backlight controller 140 transmits the backlight control data of the SPI data format for turning off the light sources of the backlight unit 30 to the backlight driver 130 as soon as the 2Nth frame period starts.

The gate driving circuit 110 sequentially supplies the gate pulse to the gate lines G. The data driving circuit 120 converts the right eye image data $RGB_R$ into the data voltage and supplies the data voltage to the data lines D of the display panel 10. The shutter control signal transmitting unit 160 transmits the shutter control signal $C_{ST}$ of the high logic level to the shutter control signal receiving unit 150, and the shutter control signal receiving unit 150 opens only the left eye shutter $ST_L$ in response to the shutter control signal $C_{ST}$ of the high logic level (steps S109 and 110).

After the predetermined time T1 elapsed from the start time of the 2Nth frame period, the timing controller 170 changes the logic level of the shutter control signal $C_{ST}$ from the high logic level to the low logic level and supplies the shutter control signal $C_{ST}$ of the low logic level to the shutter control signal transmitting unit 160. The shutter control signal transmitting unit 160 transmits the shutter control signal $C_{ST}$ of the low logic level to the shutter control signal receiving unit 150, and the shutter control signal receiving unit 150 opens only the right eye shutter $ST_R$ in response to the shutter control signal $C_{ST}$ of the low logic level (steps S111 and 112).

After a predetermined time T2 elapsed from the start time of the 2Nth frame period, the backlight controller 140 transmits the backlight control data of the SPI data format for turning on the light sources of the backlight unit 30 to the backlight driver 130. The backlight driver 130 turns on the light sources of the backlight unit 30 in response to the backlight control data of the SPI data format (steps S113 and 114).

As shown in FIGS. 4, 5A and 5B, after the predetermined time T1 elapsed from the start time of the (2N−1)th frame period, the left eye shutter $S_{TL}$ is opened and the right eye shutter $S_{TR}$ is closed. After the predetermined time T1 elapsed from the start time of the 2Nth frame period, the right eye shutter $S_{TR}$ is opened and the left eye shutter $S_{TL}$ is closed. The predetermined time T1 is set in consideration of a liquid crystal rising time TR and a liquid crystal falling time TF of the shutter glasses 50. The predetermined time T1 may be set to be longer than 0 msec and less than the time T2.

The light sources of the backlight unit 30 are turned on after the predetermined time T2 elapsed from the start time of the (2N−1)th frame period, and are turned off at a time when the (2N−1)th frame period ends. Further, the light sources of the backlight unit 30 are turned on after the predetermined time T2 elapsed from the start time of the 2Nth frame period, and are turned off at a time when the 2Nth frame period ends. In other words, the light sources of the backlight unit 30 are turned on in synchronization with a vertical blanking interval VBI in which data is not addressed to the display panel 10. Thus, the predetermined time T2 is set in consideration of the vertical blanking interval VBI.

As shown in FIG. 5B, in the 3D mode, the backlight driver 130 supplies the backlight driving current $I_{BLU}$ greater than the backlight driving current $I_{BLU}$ of the 2D mode to the light sources of the backlight unit 30. In the 2D mode, because the duty ratio of the PWM signal is 100%, the light sources of the backlight unit 30 are continuously turned on during the (2N−1)th and 2Nth frame periods. However, in the 3D mode, the light sources of the backlight unit 30 are turned on in synchronization with the vertical blanking interval VBI. Accordingly, the backlight driver 130 increases the backlight driving current $I_{BLU}$ of the 3D mode and supplies the backlight driving current $I_{BLU}$ greater than the backlight driving current $I_{BLU}$ of the 2D mode to the light sources of the backlight unit 30. Hence, the luminance of the 3D mode is prevented from being greatly less than the luminance of the 2D mode.

Figure 6:
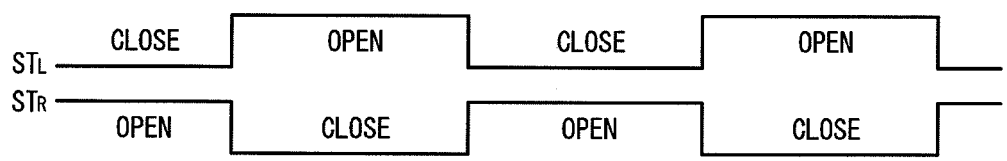
FIG. 6 illustrates operations of a left eye shutter and a right eye shutter of shutter glasses.

FIG. 6 illustrates operations of the left eye shutter and the right eye shutter of the shutter glasses. As shown in FIG. 6, the left eye shutter $ST_L$ and the right eye shutter $ST_R$ are alternately opened. Namely, when the left eye shutter $ST_L$ is opened, the right eye shutter $ST_R$ is closed. When the right eye shutter $ST_R$ is opened, the left eye shutter $ST_L$ is closed. As a result, both the left and right eye shutters $ST_L$ and $ST_R$ of the shutter glasses 50 are not simultaneously opened or are not simultaneously closed.

Figure 7:
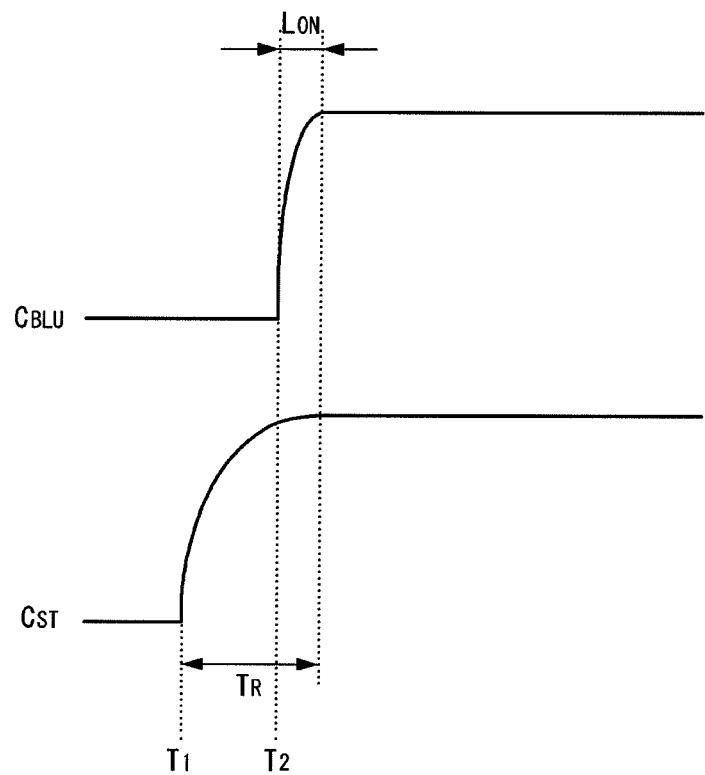
FIG. 7 is a waveform diagram illustrating a driving waveform of a backlight driving current and a shutter control signal during a duration ranging from a time T1 to a time T2 shown in FIG. 5.

FIG. 7 is a waveform diagram illustrating a driving waveform of the backlight driving current $I_{BLU}$ and the shutter control signal $C_{ST}$ during a duration ranging from the time T1 to the time T2 shown in FIG. 5B. In FIG. 7, $L_{ON}$ indicates a turn-on delay time of the light sources of the backlight unit 30, and $T_R$ indicates a liquid crystal rising delay time of the shutter glasses 50. The LED having a fast response time is suitable for the light sources of the backlight unit 30.

As shown in FIG. 7, the liquid crystal rising delay time $T_R$ of the shutter glasses 50 is greater than the turn-on delay time $L_{ON}$ of the light sources of the backlight unit 30. If the light sources of the backlight unit 30 are turned on before the liquid crystals of the shutter glasses 50 completely rises, the user may feel changes in an amount of light during the liquid crystal rising delay time $T_R$. Therefore, the quality of the 3D image is reduced.

The shutter glasses 50 have to be opened before the light sources of the backlight unit 30 are turned on. In other words, the liquid crystals of the left eye shutter $ST_L$ or the right eye shutter $ST_R$ to be opened have to completely rise before the light sources of the backlight unit 30 are turned on. An opened time (i.e., the predetermined time T1) of the shutter glasses 50 has to be earlier than the predetermined time T2 by a difference ($T_R - L_{ON}$) between the liquid crystal rising delay time $T_R$ and the turn-on delay time $L_{ON}$, so that the shutter glasses 50 is opened before the light sources of the backlight unit 30 are turned on.

A monitor connected to a computer receives an image having the frame frequency of 60 Hz to 75 Hz from a video card of the computer. The embodiment of the invention provides an optimum stereoscopic image display to the monitor connected to the computer. Because the monitor connected to the computer frequently displays a still image unlike a television, the monitor does not need to be driven at a high speed of the frame frequency equal to or greater than 120 Hz. Thus, the fact that the monitor connected to the computer is driven at the frame frequency equal to or greater than 120 Hz is unprofitable because of an increase of the cost.

Figure 8A:
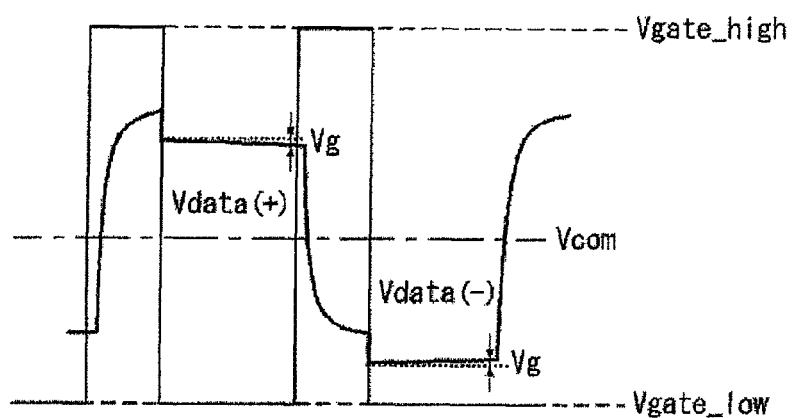
FIGS. 8A and 8B are a waveform diagram illustrating driving waveforms of a gate voltage and a data voltage when a display panel designed at 240 Hz is driven at 240 Hz and 60 Hz, respectively.
Figure 8B:
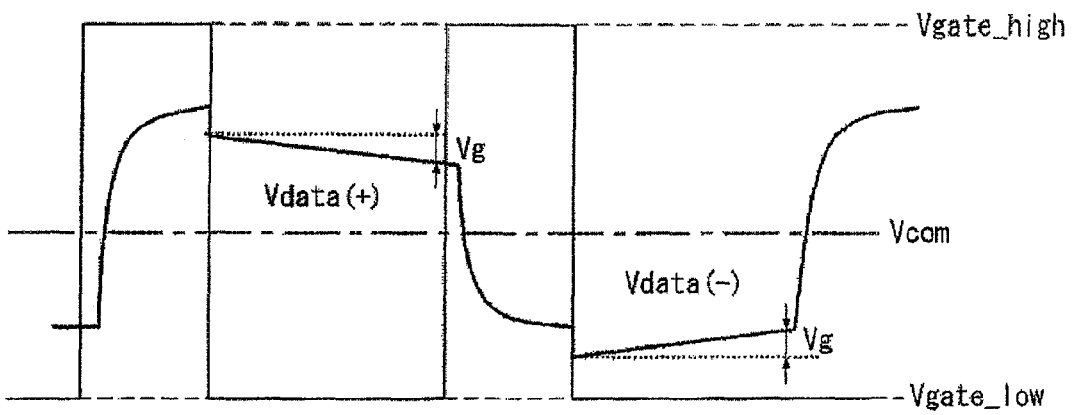

FIGS. 8A and 8B are waveform diagrams illustrating driving waveforms of a gate voltage and a data voltage when a display panel designed at 240 Hz is driven at 240 Hz and 60 Hz, respectively. In a display panel driven at the frame frequency of 60 Hz to 75 Hz, because a length of one frame period is as long as approximately 16.67 msec at 60 Hz, a capacitance of a storage capacitor is set to a large value. However, in a display panel high-speed driven at the frame frequency of 240 Hz, because a length of one frame period is as short as approximately 4.17 msec, a capacitance of a storage capacitor is set to a small value.

As shown in FIG. 8A, when the length of one frame period is short, there is little voltage Vg lost in a monitor designed to be suitable for the frame frequency of 240 Hz in spite of the small capacitance of the storage capacitor. Thus, a data voltage Vdata is uniformly held during one frame period.

However, the fact that the monitor designed to be suitable for the frame frequency of 240 Hz is driven at 60 Hz means that the length of one frame period is set to be relatively small, compared with the capacitance of the storage capacitor. Thus, as shown in FIG. 8B, when the monitor suitable for the frame frequency of 240 Hz is driven at 60 Hz, a loss amount of voltage Vg increases. Further, the data voltage Vdata is not uniformly held during one frame period and is reduced. As a result, a corresponding gray level may not be clearly represented.

When the monitor suitable for the frame frequency of 240 Hz displays the still image and the 2D image at 60 Hz, a corresponding gray level may not be clearly represented and image sticking may be generated. Hence, the cost may increase. Thus, the stereoscopic image display according to the embodiment of the invention is driven at the frame frequency of 60 Hz to 75 Hz when displaying the still image and the 2D image and is driven at the frame frequency of 120 Hz when displaying the 3D image, so as to clearly display all of the still image, the 2D image, and the 3D image.

As described above, in the stereoscopic image display according to the embodiment of the invention, because the light sources of the backlight unit are turned on during the vertical blanking interval so that the brightness in the 3D mode is greater the brightness in the 2D mode, the luminance of the 3D mode can be improved. Further, the left and right eye shutters are opened before the vertical blanking interval in consideration of the liquid crystal rising response delay of the shutter glasses, and the image is supplied to the left and right eye shutters through the control of the backlight unit having the fast response time. Hence, the 3D crosstalk can be prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a display panel including data lines and gate lines, and configured to display a two-dimensional (2D) image data in a 2D mode and display a three-dimensional (3D) image data in a 3D mode;
a backlight unit configured to provide light to the display panel;
a timing controller configured to
distinguish the 2D mode from the 3D mode according to a mode signal selected by a user input device, wherein a backlight driving current is controlled by a switch receiving the mode signal and selecting a different resistor configuration in each of the 2D mode and the 3D mode, and the switch receiving the mode signal includes resistors connected in series in the 2D mode and resistors connected in parallel in the 3D mode,
supply a left eye image data during a data addressing period of a (2N−1)th frame period, and
supply a right eye image data during a data addressing period of a 2Nth frame period in the 3D mode, where N is a natural number;
a backlight controller configured to generate the backlight control signal for controlling light sources of the backlight unit so that the light sources of the backlight unit are turned on during a vertical blanking interval of each of the (2N−1)th frame period and the 2Nth frame period in the 3D mode, wherein the backlight control signal includes a control value of a duty ratio of a pulse width modulation (PWM) signal;
a backlight driver configured to supply a backlight driving current to the light sources of the backlight unit in response to the backlight control signal received from the backlight controller, and to reduce the duty ratio of the PWM signal of the light sources in the 3D mode so that a turn-on ratio of the light sources in the 3D mode is less than that in the 2D mode;
a gate driver configured to receive a gate control signal of the 2D mode from the timing controller, and supply a gate pulse to the gate lines;
a data driver configured to latch the 2D image data under control of the timing controller, convert the latched 2D image data into positive and negative analog gamma compensation voltages, invert a polarity of the latched 2D image data voltage in response to a polarity control signal, and output the positive and negative analog gamma compensation voltages to the data lines; and
shutter glasses including a left eye shutter and a right eye shutter that are electrically controlled and are alternately changed to an opened or closed state simultaneously,
wherein the shutter glasses are not both in the opened states at the same time, and are not both in the closed states at the same time,
wherein, at a first predetermined time, the changing of the states of the shutter glasses begins,
wherein, at a second predetermined time, the vertical blanking interval starts, and a turn-on delay time of the light sources of the backlight unit starts,
wherein, at the end of a delay time after the second predetermined time has elapsed, the changing of the states of the shutter glasses ends, and the turn-on delay time of the light sources of the backlight unit ends,
wherein, at the end of the delay time after the second predetermined time has elapsed, the end of the changing of the states of the shutter glasses is synchronized with the end of the turn-on delay time of the lights sources of the backlight unit, so that (a) the light sources of the backlight unit are not fully turned on until substantially the same time as when the shutter glasses finish the changing of the states, and (b) there is substantially no separation in time relative to the total length of time between the changing of the states of the shutter glasses, from when the shutter glasses finish the changing of the states to when the light sources of the backlight unit are fully turned on, and wherein the display panel is driven, by the timing controller, at a frame frequency of (60×i) Hertz, where i is an integer greater than or equal to two.

2. The stereoscopic image display according to claim 1, wherein the left eye shutter has been already opened at a start time of the vertical blanking interval of the (2N−1)th frame period, and the right eye shutter has been already opened at a start time of the vertical blanking interval of the 2Nth frame period.

3. The stereoscopic image display according to claim 1, wherein the backlight driver outputs the backlight driving current of which a value in the 3D mode is greater than that of the 2D mode.

4. The stereoscopic image display according to claim 1, wherein an opened time of the shutter glasses is earlier than the start time of the vertical blanking interval by a difference between a liquid crystal rising delay time of the shutter glasses and a turn-on delay time of the light sources of the backlight unit.

5. A stereoscopic image display comprising:
   a display panel including data lines and gate lines, and configured to display a two-dimensional (2D) image data in a 2D mode and display a three-dimensional (3D) image data in a 3D mode;
   a backlight unit configured to provide light to the display panel;
   a timing controller configured to:
      distinguish the 2D mode from the 3D mode according to a mode signal selected by a user input device, wherein a backlight driving current is controlled by a switch receiving the mode signal and selecting a different resistor configuration in each of the 2D mode and the 3D mode, and the switch receiving the mode signal includes resistors connected in series in the 2D mode and resistors connected in parallel in the 3D mode,
      supply a left eye image data during a data addressing period of a (2N)th frame period, and
      supply a right eye image data during a data addressing period of a (2N−1)th frame period in the 3D mode, where N is a natural number;
   a backlight controller configured to generate the backlight control signal for controlling light sources of the backlight unit so that the light sources of the backlight unit are turned on during a vertical blanking interval of each of the (2N−1)th frame period and the 2Nth frame period in the 3D mode, wherein the backlight control signal includes a control value of a duty ratio of a pulse width modulation (PWM) signal;
   a backlight driver configured to supply a backlight driving current to the light sources of the backlight unit in response to the backlight control signal received from the backlight controller, and to reduce the duty ratio of the PWM signal of the light sources in the 3D mode so that a turn-on ratio of the light sources in the 3D mode is less than that in the 2D mode;
   a gate driver configured to receive a gate control signal of the 2D mode from the timing controller, and supply a gate pulse to the gate lines;
   a data driver configured to latch the 2D image data under control of the timing controller, convert the latched 2D image data into positive and negative analog gamma compensation voltages, invert a polarity of the latched 2D image data voltage in response to a polarity control signal, and output the positive and negative analog gamma compensation voltages to the data lines; and
   shutter glasses including a left eye shutter and a right eye shutter that are electrically controlled and are alternately changed to an opened or closed state simultaneously,
   wherein the shutter glasses are not both in the opened states at the same time, and are not both in the closed states at the same time,
   wherein, at a first predetermined time, the changing of the states of the shutter glasses begins,
   wherein, at a second predetermined time, the vertical blanking interval starts, and a turn-on delay time of the light sources of the backlight unit starts,
   wherein, at the end of a delay time after the second predetermined time has elapsed, the changing of the states of the shutter glasses ends, and the turn-on delay time of the light sources of the backlight unit ends,
   wherein, at the end of the delay time after the second predetermined time has elapsed, the end of the changing of the states of the shutter glasses is synchronized with the end of the turn-on delay time of the lights sources of the backlight unit, so that (a) the light sources of the backlight unit are not fully turned on until substantially the same time as when the shutter glasses finish the changing of the states, and (b) there is substantially no separation in time relative to the total length of time between the changing of the states of the shutter glasses, from when the shutter glasses finish the changing of the states to when the light sources of the backlight unit are fully turned on, and
   wherein the display panel is driven, by the timing controller, at a frame frequency of (60×i) Hertz, where i is an integer greater than or equal to two.

6. The stereoscopic image display according to claim 5, wherein the left eye shutter has been already opened at a start time of the vertical blanking interval of the 2N th frame period, and the right eye shutter has been already opened at a start time of the vertical blanking interval of the (2N−1)th frame period.

7. The stereoscopic image display according to claim 5, wherein the backlight driver outputs the backlight driving current of which a value in the 3D mode is greater than that of the 2D mode.

8. The stereoscopic image display according to claim 5, wherein an opened time of the shutter glasses is earlier than the start time of the vertical blanking interval by a difference between a liquid crystal rising delay time of the shutter glasses and a turn-on delay time of the light sources of the backlight unit.

9. A method for driving a stereoscopic image display including a display panel including data lines and gate lines, and configured to display a 2D image data in a 2D mode and display a 3D image data in a 3D mode, a backlight unit configured to provide light to the display panel, a backlight driver configured to distinguish the 2D mode from the 3D mode according to a mode signal selected by a user input device, supply a backlight driving current to light sources of the backlight unit, and a shutter glasses including a left eye shutter and right eye shutter that are electrically controlled and are alternately changed to an opened or closed state simultaneously, the method comprising:
   distinguishing, by a timing controller, the 2D mode from the 3D mode according to a mode signal selected by a user input device, wherein a backlight driving current is controlled by a switch receiving the mode signal and selecting a different resistor configuration in each of the 2D mode and the 3D mode, and the switch receiving the mode signal includes resistors connected in series in the 2D mode and resistors connected in parallel in the 3D mode;

supplying, by the timing controller, a left eye image data during a data addressing period of a (2N−1)th frame period and supplying, by the timing controller, a right eye image data during a data addressing period of a 2Nth frame period in the 3D mode, where N is a natural number;

generating, by the timing controller, a backlight control signal for controlling the light sources of the backlight unit so that the light sources of the backlight unit are turned on during a vertical blanking interval of each of the (2N−1)th frame period and the 2Nth frame period in the 3D mode, wherein the backlight control signal includes a control value of a duty ratio of a pulse width modulation (PWM) signal;

supplying, by the backlight driver, the backlight driving current to the light sources of the backlight unit in response to the backlight control signal and reducing the duty ratio of the PWM signal of the light sources in the 3D mode so that a turn-on ratio of the light sources in the 3D mode is less than that in the 2D mode;

receiving, by a gate driver, a gate control signal of the 2D mode from the timing controller, and supply a gate pulse to the gate lines;

latching, by a data driver, the 2D image data under control of the timing controller, converting, by the data driver, the latched 2D image data into positive and negative analog gamma compensation voltages, inverting, by the data driver, a polarity of the latched 2D image data voltage in response to a polarity control signal, and outputting, by the data driver, the positive and negative analog gamma compensation voltages to the data lines, wherein the shutter glasses are not both in the opened states at the same time, and are not both in the closed states at the same time, wherein, at a first predetermined time, the changing of the states of the shutter glasses begins, wherein, at a second predetermined time, the vertical blanking interval starts, and a turn-on delay time of the light sources of the backlight unit starts, wherein, at the end of a delay time after the second predetermined time has elapsed, the changing of the states of the shutter glasses ends, and the turn-on delay time of the light sources of the backlight unit ends, wherein, at the end of the delay time after the second predetermined time has elapsed, the end of the changing of the states of the shutter glasses is synchronized with the end of the turn-on delay time of the lights sources of the backlight unit, so that (a) the light sources of the backlight unit are not fully turned on until substantially the same time as when the shutter glasses finish the changing of the states, and (b) there is substantially no separation in time relative to the total length of time between the changing of the states of the shutter glasses, from when the shutter glasses finish the changing of the states to when the light sources of the backlight unit are fully turned on, and wherein the display panel is driven, by the timing controller, at a frame frequency of (60×i) Hertz, where i is an integer greater than or equal to two.

10. The method according to claim 9, further comprising:
controlling the shutter glasses so that the left eye shutter has been already opened at a start time of the vertical blanking interval of the (2N−1)th frame period and the right eye shutter has been already opened at a start time of the vertical blanking interval of the 2Nth frame period.

11. The method according to claim 9, further comprising:
outputting the backlight driving current of which a value in the 3D mode is greater than that of the 2D mode.

12. The method according to claim 9, wherein an opened time of the shutter glasses is earlier than the start time of the vertical blanking interval by a difference between a liquid crystal rising delay time of the shutter glasses and a turn-on delay time of the light sources of the backlight unit.

13. A method for driving a stereoscopic image display including a display panel including data lines and gate lines, and configured to display a 2D image data in a 2D mode and display a 3D image data in a 3D mode, a backlight unit configured to provide light to the display panel, a backlight driver configured to supply a backlight driving current to light sources of the backlight unit, and a shutter glasses including a left eye shutter and right eye shutter that are electrically controlled and are alternately changed to an opened or closed state simultaneously, the method comprising:

distinguishing, by a timing controller, the 2D mode from the 3D mode according to a mode signal selected by a user input device, wherein a backlight driving current is controlled by a switch receiving the mode signal and selecting a different resistor configuration in each of the 2D mode and the 3D mode, and the switch receiving the mode signal includes resistors connected in series in the 2D mode and resistors connected in parallel in the 3D mode;

supplying, by the timing controller, a left eye image data during a data addressing period of a 2Nth frame period and supplying, by the timing controller, a right eye image data during a data addressing period of a (2N−1)th frame period in the 3D mode, where N is a natural number;

generating, by the timing controller, a backlight control signal for controlling the light sources of the backlight unit so that the light sources of the backlight unit are turned on during a vertical blanking interval of each of the (2N−1)th frame period and the 2Nth frame period in the 3D mode, wherein the backlight control signal includes a control value of a duty ratio of a pulse width modulation (PWM) signal;

supplying, by the backlight driver, the backlight driving current to the light sources of the backlight unit in response to the backlight control signal and reducing the duty ratio of the PWM signal of the light sources in the 3D mode so that a turn-on ratio of the light sources in the 3D mode is less than that in the 2D mode;

receiving, by a gate driver, a gate control signal of the 2D mode from the timing controller, and supply a gate pulse to the gate lines;

latching, by a data driver, the 2D image data under control of the timing controller, converting by the data driver the latched 2D image data into positive and negative analog gamma compensation voltages, inverting, by the data driver, a polarity of the latched 2D image data voltage in response to a polarity control signal, and outputting, by the data driver, the positive and negative analog gamma compensation voltages to the data lines, wherein the shutter glasses are not both in the opened states at the same time, and are not both in the closed states at the same time, wherein, at a first predetermined time, the changing of the states of the shutter glasses begins, wherein, at a second predetermined time, the vertical blanking interval starts, and a turn-on delay time of the light sources of the backlight unit starts, wherein, at the end of a delay time after the second predetermined time has elapsed, the changing of the states of the shutter glasses ends, and the turn-on delay time of the light sources of the backlight unit ends, wherein, at the end of the delay time after the second predetermined time has elapsed, the end of the changing of the states of the shutter glasses is synchronized with the end of the turn-on delay time of the lights sources of the backlight unit, so that (a) the light sources of the backlight unit are not fully turned on until substantially the same time as when the shutter glasses finish the changing of the states, and (b) there is substantially no separation in time relative to the total length of time between the changing of the states of the shutter glasses, from when the shutter glasses finish the changing of the states to when the light sources of the backlight unit are fully turned on, and wherein the display panel is driven, by the timing controller, at a frame frequency of (60×i) Hertz, where i is an integer greater than or equal to two.

14. The method according to claim 13, further comprising:

controlling the shutter glasses so that the left eye shutter has been already opened at a start time of the vertical blanking interval of the 2Nth frame period and the right eye shutter has been already opened at a start time of the vertical blanking interval of the (2N−1)th frame period.

15. The method according to claim 13, further comprising:

outputting the backlight driving current of which a value in the 3D mode is greater than that of the 2D mode.

16. The method according to claim 13, wherein an opened time of the shutter glasses is earlier than the start time of the vertical blanking interval by a difference between a liquid crystal rising delay time of the shutter glasses and a turn-on delay time of the light sources of the backlight unit.

* * * * *